United States Patent [19]
Woodbridge et al.

[11] Patent Number: 5,696,413
[45] Date of Patent: Dec. 9, 1997

[54] RECIPROCATING ELECTRIC GENERATOR

[75] Inventors: David D. Woodbridge, Tampa; Thomas C. Woodbridge, Satellite Beach, both of Fla.

[73] Assignee: Aqua Magnetics, Inc., Tampa, Fla.

[21] Appl. No.: 327,593

[22] Filed: Oct. 24, 1994

[51] Int. Cl.$^6$ ................................................ H02K 33/00
[52] U.S. Cl. ........................... 310/15; 310/24; 290/53
[58] Field of Search ............................... 310/14, 15, 17, 310/20, 22–24, 30, 33–35; 290/42, 53

[56] References Cited

U.S. PATENT DOCUMENTS

| | | | |
|---|---|---|---|
| 3,231,749 | 1/1966 | Hinck, III | 290/53 |
| 3,362,336 | 1/1968 | Kafka | 103/44 |
| 3,696,251 | 10/1972 | Last et al. | 290/53 |
| 3,783,302 | 1/1974 | Woodbridge | 290/42 |
| 4,110,630 | 8/1978 | Hendel | 290/53 |
| 4,239,976 | 12/1980 | Collard | 290/42 |
| 4,260,901 | 4/1981 | Woodbridge | 290/42 |
| 4,423,334 | 12/1983 | Jacobi et al. | 290/53 |
| 4,491,738 | 1/1985 | Kamp | 290/53 X |
| 4,539,485 | 9/1985 | Neuenschwander | 290/53 |
| 4,631,455 | 12/1986 | Taishoff | 310/24 X |
| 5,036,930 | 8/1991 | Bisel et al. | 310/15 X |
| 5,172,784 | 12/1992 | Varela, Jr. | 180/65.4 |
| 5,457,349 | 10/1995 | Gifford | 310/24 |
| 5,499,889 | 3/1996 | Yim | 405/76 |

Primary Examiner—Mark O. Budd
Attorney, Agent, or Firm—William M. Hobby, III

[57] ABSTRACT

An electric generator includes a base having an outer pole flux core supported on the base and having a linear bore extending thereinto. A plurality of permanent magnets are mounted to the outer pole along the interior of the linear bore. A center pole flux core extends into the linear bore of the outer pole flux core. A generator coil is formed on the coil support sleeve and slidably mounted over the center pole flux core in the outer pole flux core linear bore and extends from the outer pole linear bore. A float member is attached to the generator coil support sleeve for moving the support sleeve responsive to movement of the float movement whereby the electric generator produces electric power responsive to movement of the float when the float is positioned to float on an oscillated fluid, such as when the electric generator is mounted to a platform over ocean swells. The center pole flux core may also have a plurality of inner magnets mounted therearound and a pair of electric generators may be mounted adjacent each other so that a rocking float can be connected to two electric generator coil support sleeves for moving the support sleeves in the generator coil in an alternate motion with the rocking of the float.

7 Claims, 2 Drawing Sheets

RECIPROCATING ELECTRIC GENERATOR

BACKGROUND OF THE INVENTION

The present invention relates to an electrical generator and especially to an electric generator which produces electric power responsive to movement of a float riding in an oscillating fluid.

Open ocean swells contain large amounts of energy which can be utilized as an alternative source of electric power. This type of energy source does not create pollution or depend on finite resources. In the past, a variety of systems have been utilized to generate electric power from ocean swells by converting the motion of the waves to some other form of energy to turn a conventional rotating generator. This type of system can be seen in prior systems which use wave motion to drive a hydraulic pump to force a fluid through a turbine connected to an electrical generator. Other ocean energy systems use wave motion to force air through hollow shafts. One such system uses a by-directional turbine placed in the air shaft to produce electric power. The air is forced up the shaft by the oncoming waves and is sucked back from the shaft as the wave recedes. The air motion in the shaft then turns the turbine which drives the generator. Each of these systems suffers from loss of efficiency in the process of converting wave motion into movement of a fluid and in turn use the fluid motion to turn a turbine which drives a generator.

Prior U.S. patents which can be seen for producing electrical energy from ocean wave motion can be seen in the Rich U.S. Pat. No. 3,546,473, for an Oceanographic Generator which uses two floats, one which follows the displacement of the water surface and another which remains in a substantially stable position independent of the motion of the water and has a permanent magnet and coil attached to the float. An electro-motive force is induced in the coil upon the occurrence of a relative motion between the floats. In the Last et al. U.S. Pat. No. 3,696,251, a Method of Generating Electricity and an Electrical Generator derive electrical energy from oscillatory motion, such as in buoys or in vehicles or on animals. The generator has a stator and an armature coupled together by spring means and is effective to generate electrical current when body movement of the generator causes, by inertia effects, relative movement of the armature and stator. In the R.S. Kafka U.S. Pat. No. 3,362,336, a Wave Motion Operated Device is provided in a two component device which uses the wave motion to achieve a pumping action to pump out the bilge of a boat. Another embodiment of the invention is for an electric power generating arrangement in which the wave motion causes the generation of current which can be rectified and thereafter used for recharging the batteries of the boat.

The Hinck III U.S. Pat. No. 3,231,749, shows a Wave Power Generator especially for use in buoys and provides an apparatus for absorbing the energy available in the rocking mode of oscillation by converting it into electrical energy. In the Collard U.S. Pat. No. 4,239,976, a Floating Electric Generator produces electric power from the flow of water using a floating rotor journalled on a non-rotating shaft which is moored in place. The rotor is turned by peripheral vanes engaging the flow of water.

In the Woodbridge prior U.S. Pat. No. 3,783,302, an apparatus and method for converting wave energy into electrical energy uses floats to move a flexible coil in a magnetic field. In Woodbridge U.S. Pat. No. 4,260,901, a wave operated electrical generator system uses floats to oscillate arcuate permanent magnets into and out of electrical coils.

In contrast, the present invention is directed towards an electric generator adapted to increase the efficiency of a linear moving coil directly moved by a float riding on waves or other oscillating fluids in a manner to convert as much of the kinetic energy in the wave directly to electrical energy in locations where there is constant wave motion and uses a linear permanent magnet, electric generator having a linear rotor which is annularly wound on a sleeve moving coaxially in a coaxial bore formed with a center pole flux core in the center of the sleeve and an outer pole flux core on the exterior of the annular bore, both of which can be lined with permanent magnets in a pattern to produce effective electrical energy by the movement of the linear moving generator coil.

SUMMARY OF THE INVENTION

An electric generator includes a base having an outer pole flux core supported on the base and having a linear bore extending thereinto. A plurality of permanent magnets are mounted to the outer pole along the interior of the linear bore. A center pole flux core extends into the linear bore in the outer pole flux core. A generator coil is formed on a coil support sleeve and is movably mounted over the center pole flux core in the outer pole flux core linear bore and extends from the outer pole linear bore. A float member is attached to the generator coil support sleeve for moving the support sleeve responsive to movement of the float movement whereby the electric generator produces electric power responsive to movement of the float when the float is positioned to float on an oscillated fluid, such as when the electric generator is mounted to a platform over ocean swells. The center pole flux core may also have a plurality of inner magnets mounted therearound and a pair of electric generators may be mounted adjacent each other so that a rocking float can be connected to two electric generator coil support sleeves for moving the support sleeves in the generator coil in an alternate motion with the rocking of the float.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
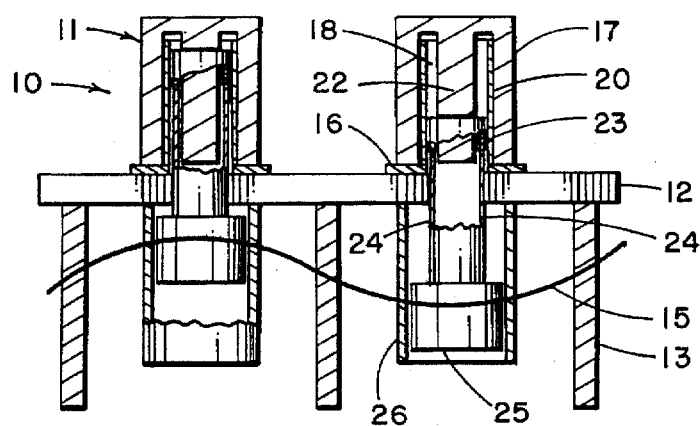
FIG. 1 is a sectional view of a pair of electric generators in accordance with the present invention mounted to a platform positioned over ocean swells.
Figure 3:
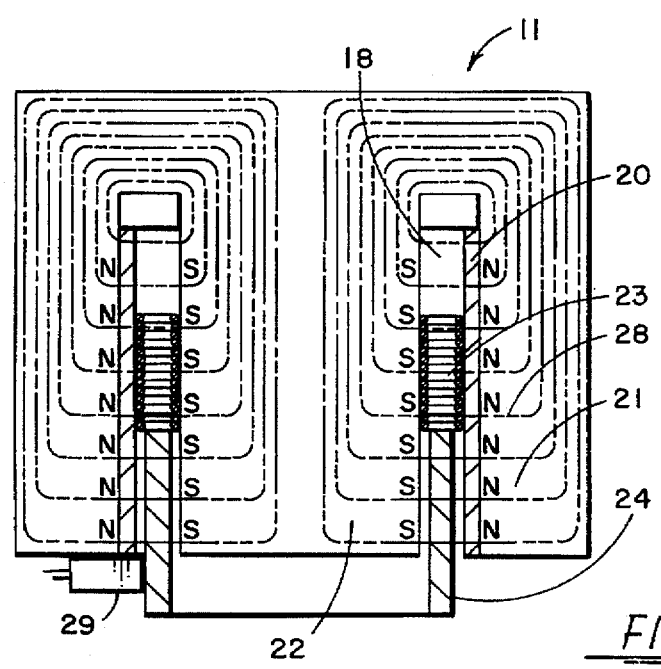
FIG. 3 is a sectional view taken through a reciprocating generator of FIGS. 1 and 2 and showing the magnetic poles of the permanent magnets.

Referring to the drawing of FIG. 1, an electrical generator for generating electric power from ocean swells is illustrated with an ocean rig 10 having a pair of generators 11 mounted to the platform 12 supported on a plurality of pilings 13. The movement of the ocean swells 15 can be seen below the platform 12. Each generator 11 has a base 16 and a block of ferromagnetic material 17 having an annular bore 18 therein and having a plurality of permanent magnets 20 mounted on the exterior wall of the bore 18. The annular bore thus forms an outer pole flux core 21 and a center pole flux core 22 by virtue of the annular bore 18. A generator coil 23 is mounted on a coil support sleeve 24 which sleeve 24 in turn is mounted to a float 25. The float 25 rides in a cylindrical sleeve 26 extending into the ocean and sized for the cylindrical float 25 to ride therein without the wave motion 15 moving the float from side-to-side. Float 25 rises and falls with the wave motion 15 driving sleeve 24 having the generator coil 23 mounted thereon for sliding the generator coil and sleeve linearly within the annular bore 18 to provide a coaxially moving linear generating coil passing through a magnetic field having a polarity, as shown in FIGS. 3 and 4.

Figure 2:
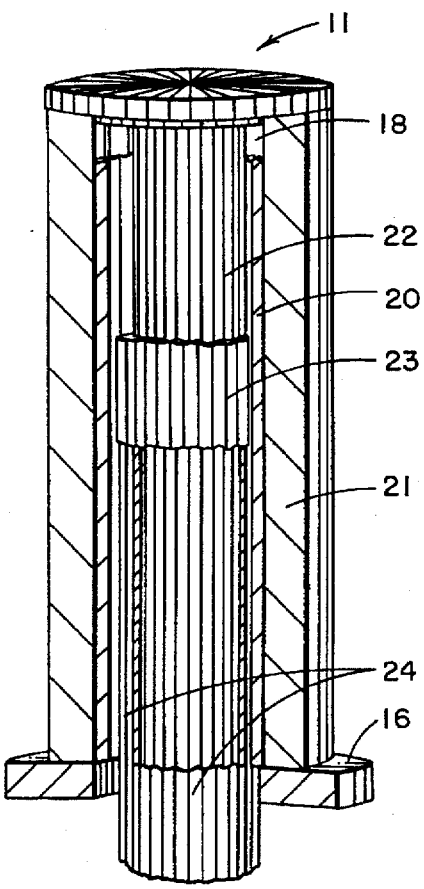
FIG. 2 is a sectional view of one electric generator in accordance with FIG. 1.

In FIG. 2, the generator 11 has the outer pole 21 and the center pole 22 with the permanent magnets 20 mounted to the outer pole 21. The generator coil 23 is riding within the annular bore 18. The generator is supported on a base 16. The coil support tube/sleeve 24 is shown for moving the generator coil 23 mounted on one end thereof within the annular bore 18 adjacent the permanent magnets 20. As seen in FIG. 3, the generator 11 has the permanent magnets 20 mounted to show their north and south poles and the magnetic flux line 28 formed in the outer pole flux core 21 and in the center pole flux core 22 as the annular wound generator coil 23 moves linearly in the annular bore 18 adjacent the magnets 20. The magnets 20 are mounted around the exterior of the annular bore 18. The wound coil 23 is mounted on a coil support sleeve 24 which may be the float drive tube which in turn is connected to the float. As shown in FIG. 3, power generated in the moving coils is transmitted through linear electrical bushings and brushes 29. The bushings are connected through to the coils.

Figure 4:
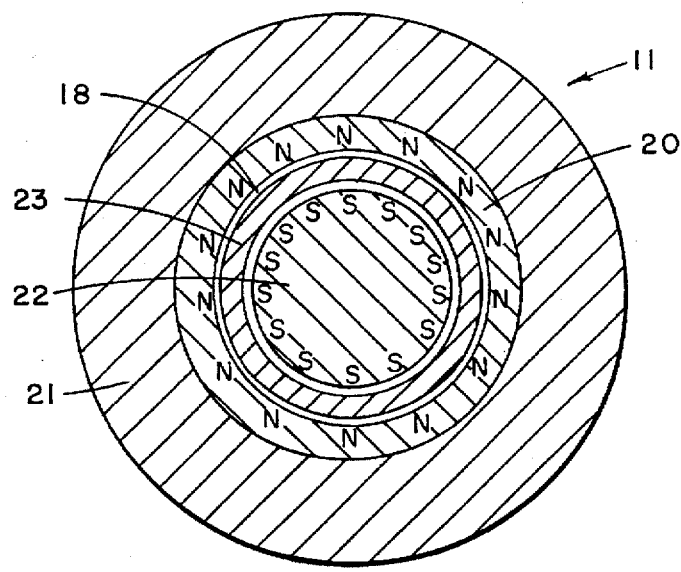
FIG. 4 is a sectional view of one reciprocating generator of FIGS. 1-3.

In FIG. 4, a cross section of the generator 11 shows the outer pole flux core 21 and the center pole flux core 22 with the generator coil 23 mounted for linear action in the annular bore 18 adjacent the permanent magnets 20 mounted around the inside of the bore 18 to the outer pole flux core 21. The magnets can also be mounted to the exterior of the center pole flux core 22 along the inside of the annular bore 18.

Figure 5:
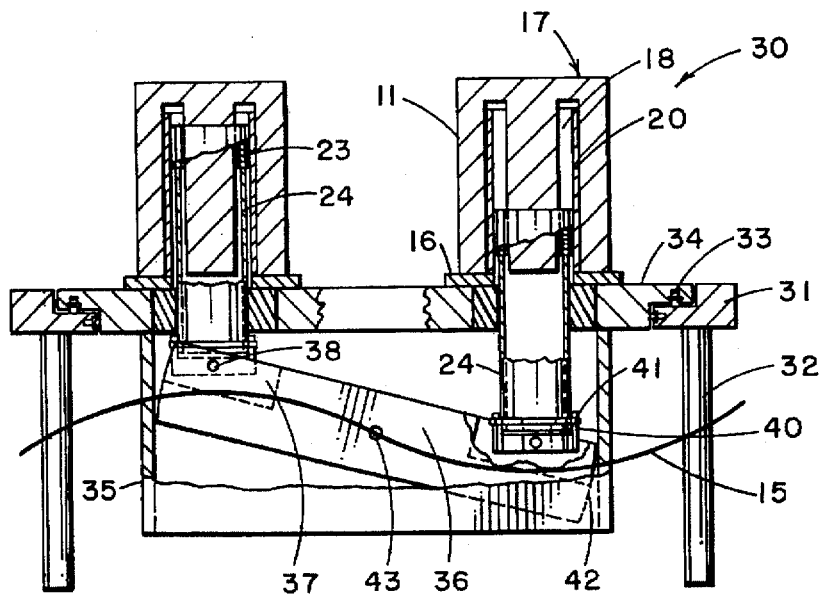
FIG. 5 is a sectional view of an alternate embodiment of a pair of electric generators.

Turning to FIG. 5, an alternate embodiment of the generator system 30 is mounted to a platform 31 having a plurality of pilings 32 supporting the platforms with float alignment drive mechanisms 33 mounted between a support center portion 34 in the platform 31. The float alignment drive mechanism 33 will turn the support center portion 34 to keep the elongated rocker float 36 in optimum alignment to the passing swells 15. A pair of reciprocating generators 11, in accordance with FIGS. 1 through 4, is attached to the support platform 34 and has the base 16 attached to the platform floor 34 along with the ferromagnetic material 17 having the annular bore 18 therein along with the permanent magnets 20 mounted along the bore 18. The bore has an annular sleeve 24 having the generator coils 23 mounted thereon. In this embodiment, a large sleeve 35 is mounted to the bottom of the platform 34 and a large elongated rocker float 36 rides in the ocean swells 15. The rocker float pivots about joint 43 which is fixed with respect to the large sleeve 35. Each end of the rocker float 36 has a cutout portion 37 having pins 38 attached to the sides thereof for supporting a yoke 40 in each end of the float 36 which in turn has a pin 41 rotatably attached to the end of the sleeve 24 for each of two generator units. Thus, the float 36 has two universal connecting joints, one on each end thereof, which allows the float member 36 to rise at each end, as illustrated in FIG. 5, riding in the ocean swells 15. Each end of the float 36 has a slightly arcuate shaped end portion 42 allowing it to slide against the large sleeve 35. Thus, the swells 15 raise and lower each end of the float 36 to thereby form a rocking action for the sleeves 24 to drive a pair of linear generators through the oscillations of the float in the oscillating swells 15.

Figure 6:
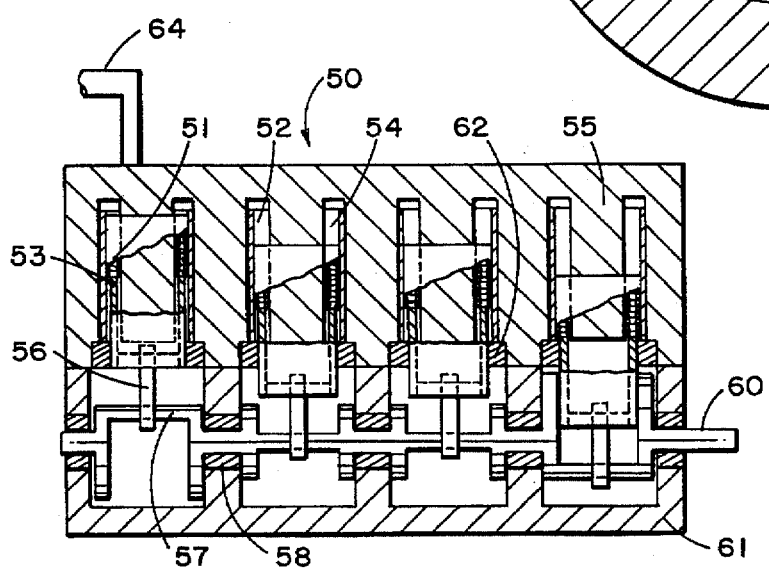
FIG. 6 is a sectional view of an electric motor interconnected to the electric generator of FIG. 5.

Turning to FIG. 6, an electric motor 50 is shown which is electrically connected from the generator apparatus of FIGS. 1 to 4 and produces a rotary motion from the electric power produced by the generator by supplying the electric current to the coils that cause a force to be placed on the coils 51. This causes the coils 51 to move through the magnetic field perpendicular to the magnetic flux crossing the air gap formed by the permanent magnets 52. Sensors switch the direction of the electric current flowing through the coils 51 which sensors can be placed at the top and bottom of the magnetic flux concentration. The coils are wrapped on coil support tubes 53 which move up and down in annular bores 54 formed within ferromagnetic flux carrier 55. Four reciprocating coil units are illustrated each connected to a coil support tube 53 and each coil support tube 53 is in turn connected to a connecting rod 56 which is in turn connected to a crank shaft 57. The crank shaft 57 is mounted on crank shaft bearings 58 and has a crank shaft input/output shaft 60 which provides a rotary motion within an aluminum crank case 61. When each coil 51 reaches a top or bottom sensor, the electric current applied to the coil is switched in polarity. This switch in the direction that the electric current is flowing through the coil enhances the direction of the force developed on the coil in the magnetic field. This drives the coil back in the opposite direction until a sensor at the other end of the magnetic flux concentration is reached and the process is repeated. Thus, the coil is made to reciprocate up and down through the magnetic field as long as the electric current is applied to the system. Linear bearings 62 are provided for each of the coil support tubes 53 to maintain the coil support tubes and coils riding free within the annular bores 54 so that the tube is sliding coaxially within the annular bore to provide a flux field both inside the annular bore as well as outside. The crankshaft 57 is thus rotated by the reciprocating motion of the coils 51 supplying a torque to the output shaft 60.

A series of coil support tubes are attached to the crank shaft 57, as illustrated in FIG. 5, to smooth out the effect of the switching of the force direction on the output torque and to help balance the vibration caused by the rotating masses of the coil. As illustrated, an in-line 4 arrangement is provided with the coils attached to the crankshaft at 0°, 90°, 270°, and 180°. The amount of force developed by the coils 51 in the magnetic field when an electric current has passed through it is determined by the equation:

F=Bli where "F" is equal to the developed force on the coil, "B" is equal to the magnetic flux density, "l" is equal to the length of the conductor within the magnetic field in meters, and "i" is equal to the magnitude of the current passing through the coil in amperes.

The developed force translates the torque on the crankshaft that can be used for any purpose desired. The amount of torque supplied to the output is dependent on the torque arm of the crankshaft 60, the number of coils 51 attached to the crankshaft, and the speed at which the coils are reciprocating through the magnetic field. The coil support tube can be attached directly to any device that requires an applied reciprocating force for operation such as the direct drive for a piston pump.

The electric motor 50 receives the input power through a series of conductors 64 which are connected to an electric generator, as illustrated in FIGS. 1–5, so that a combined electrical generating system and electric motor can produce electric power from an ocean swell wave energy conversion which is applied directly to a reciprocating electric motor operating in reverse to the generator to produce power without having to first filter and phase match the electric power from the electric generator.

It should be clear at this time that a linear electrical generator has been provided for generating electric energy from ocean swells or any other oscillating motion of a fluid to move floats to drive a linear generator which has been designed with improved efficiency. However, the present invention should not be limited to the forms shown which are to be considered illustrative rather than restrictive.

I claim:

1. An electric generator comprising:

a base;

a plurality of outer pole flux core supported on said base, each having a linear bore extending thereinto;

a plurality of permanent magnets mounted to each said outer pole flux core along said linear bore;

a plurality of center pole flux cores each extending into one said linear bore of said outer pole flux core;

a plurality of generator coils each formed on a coil support sleeve and slidably mounted over one said center pole flux core in said outer pole flux core linear bore and extending therefrom;

a rocking float member having first and second end portions and having each said first and second end portion attached to one said generator coil support sleeve for moving said support sleeve responsive to movement of said float movement, whereby said electric generator can produce electric power responsive to movement of a float when the float is positioned to float on an oscillating fluid.

2. An electric generator in accordance with claim 1 including a plurality of inner magnets mounted to said center pole flux cores.

3. An electric generator in accordance with claim 1 in which said rocking float member is movably coupled to each coil support sleeve with a yoke.

4. An electric generator in accordance with claim 3 in which said base is mounted to a platform positioned above a water surface having wave motion to thereby move said floats.

5. An electric generator in accordance with claim 4 in which said electric generator is mounted vertically to said platform whereby said generator coil has a gravity return.

6. An electric generator in accordance with claim 5 in which said platform has a plurality of alignment members for aligning said platform and generators over a water source having waves.

7. An electric generator and motor system comprising:

an electric generator having:

a base;

an outer pole flux core supported on said base and having a linear bore extending thereinto;

a plurality of permanent magnets mounted to said outer pole along said linear bore;

a center pole flux core extending into said linear bore of said outer pole;

a generator coil formed on a coil support sleeve and slidably mounted over said center pole in said outer pole linear bore and extending from said outer pole linear bore;

a float member attached to said generator coil support sleeve for moving said support sleeve responsive to movement of said float movement, whereby said electric generator can produce electric power responsive to movement of a float when the float is positioned to float on an oscillating fluid; and an electric motor electrically connected to said electric generator, said electric motor having:

a motor housing having a plurality of annular bores therein;

a motor crankshaft rotatably mounted in said housing and having a rotatable shaft extending from said housing;

a plurality of reciprocating sleeves, each sleeve slidably mounted in one of said annular bores in said housing and each having annular coil mounted thereon and each said sleeve being coupled to said crankshaft for rotating said crankshaft upon each sleeve sliding in one said annular bore and each said annular bore having a plurality of permanent magnets mounted therearound whereby applying electric power to each said coil will actuate each said sleeve to rotate said crankshaft.

* * * * *